United States Patent
Pruthi et al.

(10) Patent No.: US 8,756,396 B1
(45) Date of Patent: Jun. 17, 2014

(54) CONVERSION OF IN-MEMORY DATA REPRESENTATIONS

(75) Inventors: Arvind Pruthi, Los Gatos, CA (US); Shailesh Shiwalkar, Santa Clara, CA (US)

(73) Assignee: Toshiba Corporation, Tokyo (JP)

( * ) Notice: Subject to any disclaimer, the term of this patent is extended or adjusted under 35 U.S.C. 154(b) by 601 days.

(21) Appl. No.: 13/026,572

(22) Filed: Feb. 14, 2011

Related U.S. Application Data

(60) Provisional application No. 61/305,810, filed on Feb. 18, 2010.

(51) Int. Cl.
*G06F 12/00* (2006.01)
*G06F 17/30* (2006.01)
*G06F 12/06* (2006.01)

(52) U.S. Cl.
CPC .................................. *G06F 12/0646* (2013.01)
USPC .... 711/170; 711/171; 711/202; 711/E12.084; 707/809; 707/811; 707/E17.124

(58) Field of Classification Search
CPC ..................................................... G06F 12/0646
USPC ................... 711/170, 171, 202; 707/809, 811
See application file for complete search history.

(56) References Cited

U.S. PATENT DOCUMENTS

| | | | | |
|---|---|---|---|---|
| 5,301,288 A | * | 4/1994 | Newman et al. | 711/202 |
| 5,713,002 A | * | 1/1998 | Zbikowski et al. | 711/112 |
| 6,377,958 B1 | * | 4/2002 | Orcutt | 707/690 |
| 2011/0029713 A1 | * | 2/2011 | Wade et al. | 711/6 |

\* cited by examiner

*Primary Examiner* — Aracelis Ruiz
(74) *Attorney, Agent, or Firm* — White & Case LLP

(57) ABSTRACT

Systems, methods, and other embodiments associated with managing memory are described. According to one embodiment, an apparatus includes a converter that dynamically converts a structure of a data representation stored in a memory, where the structure is selectively converted between a sparse format and a non-sparse format.

20 Claims, 5 Drawing Sheets

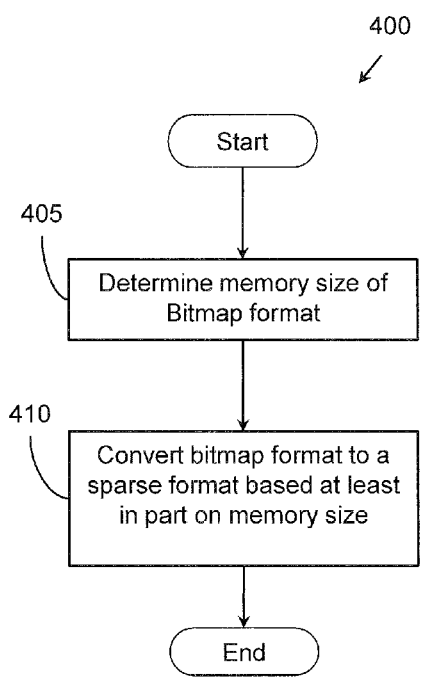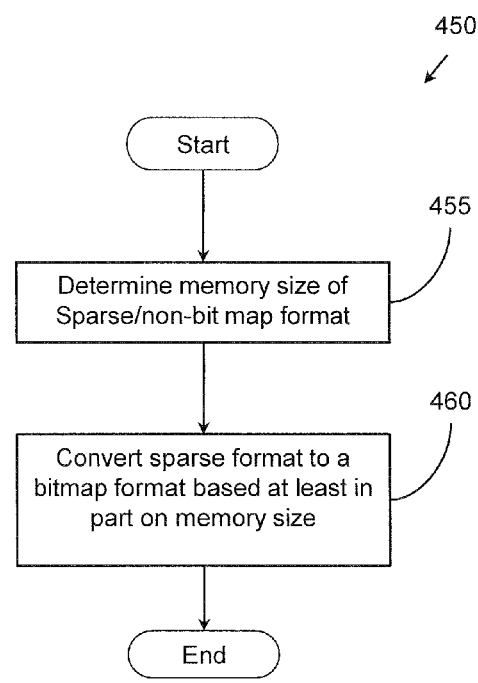
Figure 4A                    Figure 4B

CONVERSION OF IN-MEMORY DATA REPRESENTATIONS

CROSS REFERENCE TO RELATED APPLICATIONS

This application claims the benefit of U.S. provisional application Ser. No. 61/305,810 filed on Feb. 18, 2010, which is hereby wholly incorporated by reference.

BACKGROUND

Storage systems maintain information in allocation tables that indicate which data blocks from storage are assigned and which data blocks are available for allocation (e.g. free blocks). Storage systems modify the allocation tables during allocation and de-allocation to reflect the current status of each block. Most modern storage systems store allocation tables in some sort of bitmaps. Bits are set in the fields to signify blocks that are presently allocated or bits are clear to signify blocks available for future allocation.

In systems that use large persistent storage, data (and/or metadata) representation of which blocks are allocated or free can consume large amounts of the system's main memory when the entire data representation is present in the main memory.

Some systems try to reduce such a large memory footprint by using paging where the system pages-in only required data into main memory and the rest of the data is maintained on persistent storage. However in many circumstances, the cost of paging is not acceptable when the system is trying to provide quick response times for accessing its data. Also at times it might not be acceptable to keep the entire data representation in main memory due to various constraints such as having a limited total size of main memory and needing memory for other operations.

SUMMARY

In one embodiment an apparatus includes a converter configured to dynamically convert a structure of a data representation stored in a memory, where the structure is selectively converted between a sparse format and a non-sparse format, and where the data representation identifies data allocations in a persistent storage device.

In one embodiment, the non-sparse format is a bitmap representation that includes a one-to-one correspondence of bits to a number of pre-defined data extents that are defined in the persistent storage device. The sparse format is a linked list of data entries that identifies locations of data extents in the persistent storage device.

In another embodiment, the converter includes logic to determine a memory size of the sparse format based on at least the linked list of data entries and to determine a memory size of the bitmap representation. The converter is configured to convert the structure of the data representation based at least in part on a comparison of the memory sizes.

In another embodiment, the converter is configured to convert the structure of the data representation based at least in part on a memory size of the sparse format as compared to a memory size of the non-sparse format during run-time.

In another embodiment, a method comprises determining a memory size of a non-sparse format of metadata that represents data allocations for a persistent storage device and converting the non-sparse format to a sparse format based at least in part on the memory size, wherein the sparse format includes a linked list.

In one embodiment, the method includes, prior to the converting, pausing execution of allocation operations that involve the persistent storage device; generating the sparse format by traversing the non-sparse format of metadata to determine the data allocations; and restarting execution of the allocation operations.

In another embodiment, the method generates the non-sparse format as a one-to-one relationship with data extents that are pre-defined in the persistent storage device, where an indicator in the non-sparse format designates an allocation state of one of the data extents.

In another embodiment, the method includes maintaining an on-disk metadata in the persistent storage device where the on-disk metadata designates an allocation status of each data extent in the persistent storage device.

In another embodiment, the method includes generating the sparse format as a linked list of nodes where each node designates a group of contiguous data extents in the persistent storage device that are not allocated.

In another embodiment, the method further includes converting the sparse format to the non-sparse format when the memory size of the non-sparse format is less than a memory size of the sparse format.

In another embodiment, a device is provided that comprises a memory, and a data representation converter. The data representation converter is configured to generate a non-sparse data structure that indicates an allocation status in a one-to-one mapping for each data extent that is defined in a persistent storage device; generate a sparse data structure that includes a linked list of nodes, where each node identifies a group of contiguous data extents that are unallocated in the persistent storage device; maintain allocation metadata in the memory, where the allocation metadata is a form of the non-sparse data structure or the sparse data structure; and convert the form of the allocation metadata between the non-sparse data structure and the sparse data structure based at least in part on which form uses less space in the memory.

In another embodiment, the non-sparse data structure includes a bitmap where one bit is stored for each data extent in the persistent storage device, where the one bit designates the allocation status as allocated or free.

In another embodiment, the data representation converter includes logic to determine a memory size of the sparse data structure based on at least in part on the linked list of nodes and to determine a memory size of the non-sparse data structure; and wherein the data representation converter is configured to compare the memory sizes to determine which uses less space in the memory.

In another embodiment, the data representation converter is configured to determine whether to convert the form of the allocation metadata after an allocation operation is performed.

In another embodiment, the data representation converter is configured to convert the form of the allocation metadata during run-time.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. In some embodiments, one element may be designed as multiple elements or that multiple elements may be designed as one element. In some embodiments, an element shown as an internal compo

FIGS. 4A and 4B illustrate one embodiment of methods associated with managing the format of data representations.

DETAILED DESCRIPTION

Described herein are examples of systems, methods, and other embodiments associated with managing memory and converting data representations that are stored in memory. In one embodiment, a system implements two ways to structure in-core allocation metadata that represents the allocation status of data blocks in persistent storage. The system selects and switches between either of the structures at run-time depending upon the usage of the persistent storage.

Figure 1:
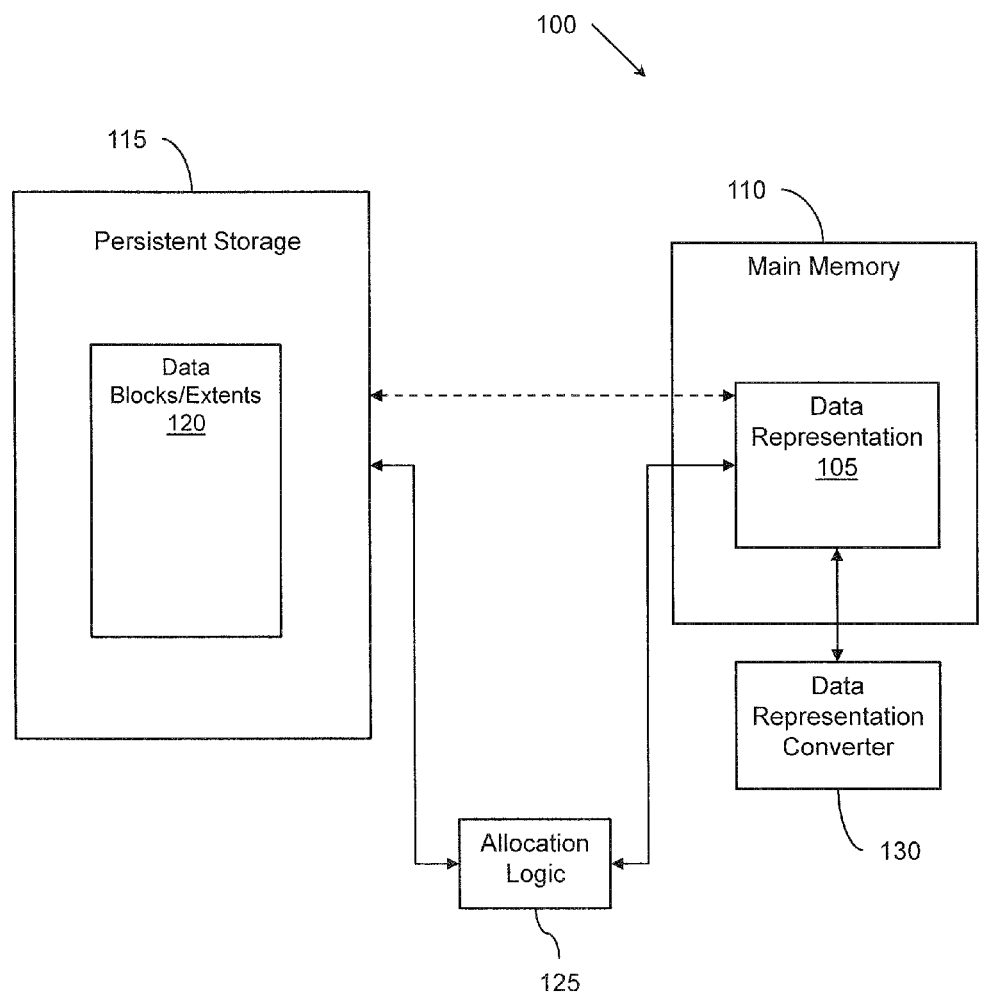
- FIG. 1 illustrates one embodiment of an apparatus associated with managing data representations.

With reference to FIG. 1, one embodiment of an apparatus 100 is shown that is associated with managing data representation(s) 105 in a main memory 110. In one embodiment, the data representation 105 is a data structure that indicates the availability/allocation of data blocks within a persistent storage device(s) 115 (e.g. hard disk drive, Redundant Array of Independent Disks (RAID), and so on). In one embodiment, the persistent storage device 115 is organized with a plurality of data blocks 120 where each data block has a predefined and equal size and the persistent storage device 115 has a predefined number of data blocks 120. In another embodiment, the data blocks may have unequal sizes.

As used herein, a data block will be referred to as a data extent. A data extent is a contiguous chunk of data of a predefined size that is present on a persistent storage device. In another embodiment, a data extent can be a set of contiguous blocks from a disk drive or set of contiguous RAID stripes (if underlying storage is available in terms of RAID). The data extent size is fixed for a given persistent storage device. Thus the number of data extents defined in the persistent storage device can be determined from the total capacity of the storage device divided by the size of a data extent.

Allocation logic 125 uses the information in the data representation 105 to determine how to allocate data extents (sparse or non-sparse format) in response to a request for storage space (e.g. a write request to store data). To help manage consumption of the memory 110, a data representation converter 130 is configured to selectively convert the structure of the data representation 105 in the memory 110 between the sparse format and a non-sparse format (or vice versa). The two formats are described with reference to FIGS. 2 and 3. The conversion is triggered by certain condition(s) that are observed/determined, which are described below. Managing the use of the memory 110 may improve memory consumption and performance.

Figure 2:
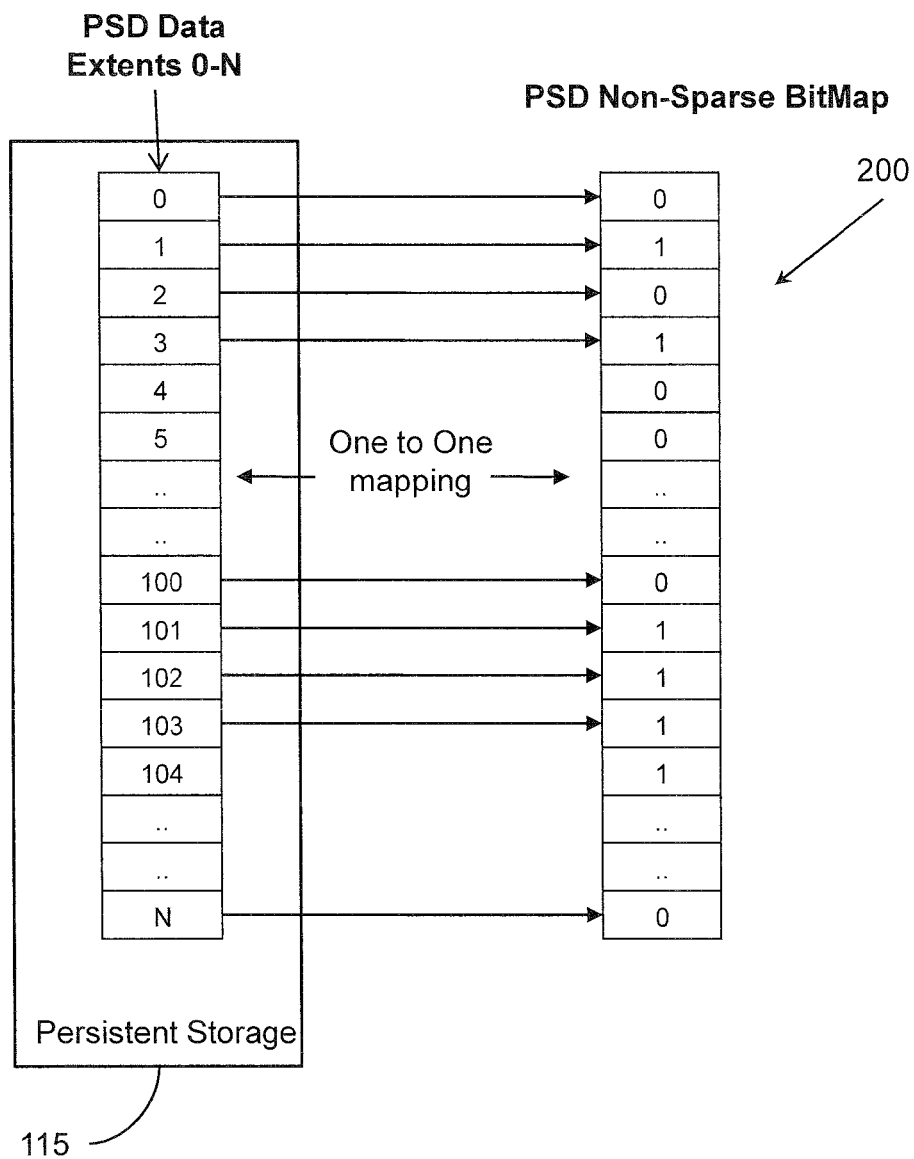
FIG. 2 illustrates one embodiment of a non-sparse data structure.

FIG. 2 illustrates one embodiment of the non-sparse format. For example, the non-sparse format is a bitmap representation 200 that includes a one-to-one correspondence of bits/indicators to a number of pre-defined data extents that are defined in the persistent storage device 115. Each bit/indicator in the non-sparse bitmap 200 is associated with one data extent. A bit/indicator that is set (e.g. a "1" value) designates that the associated data extent is allocated. A bit that is "0" means that the associated data extent is free/unallocated and thus available for allocation.

In the non-sparse bitmap representation 200, the system keeps track of both allocated and free data extents for the persistent storage device (PSD) 115. The PSD 115 is divided into a fixed number of data extents 0-N. In one embodiment, each data extent has the same size. The non-sparse bitmap 200 keeps track of all data extents present in a PSD. Each bit location in the bitmap 200 represents one data extent in the PSD in a one-to-one mapping. The non-sparse format guarantees use of a fixed amount of main memory 110 because there are a fixed number of allocation bits (e.g. in-core metadata) that correspond to the known number of data extents 0-N for the PSD 115 for a given data extent size.

The total size of the non-sparse bitmap representation 200 is determined from the number of data extents in the persistent storage 115. For example, if there are N data extents, then there are N bits in the non-sparse bitmap 200. Of course, multiple storage devices may be connected to the system and thus the non-sparse bitmap representation 200 would be increased to accommodate all the data extents, or separate bitmap representations could be maintained for each separate storage device.

Figure 3:
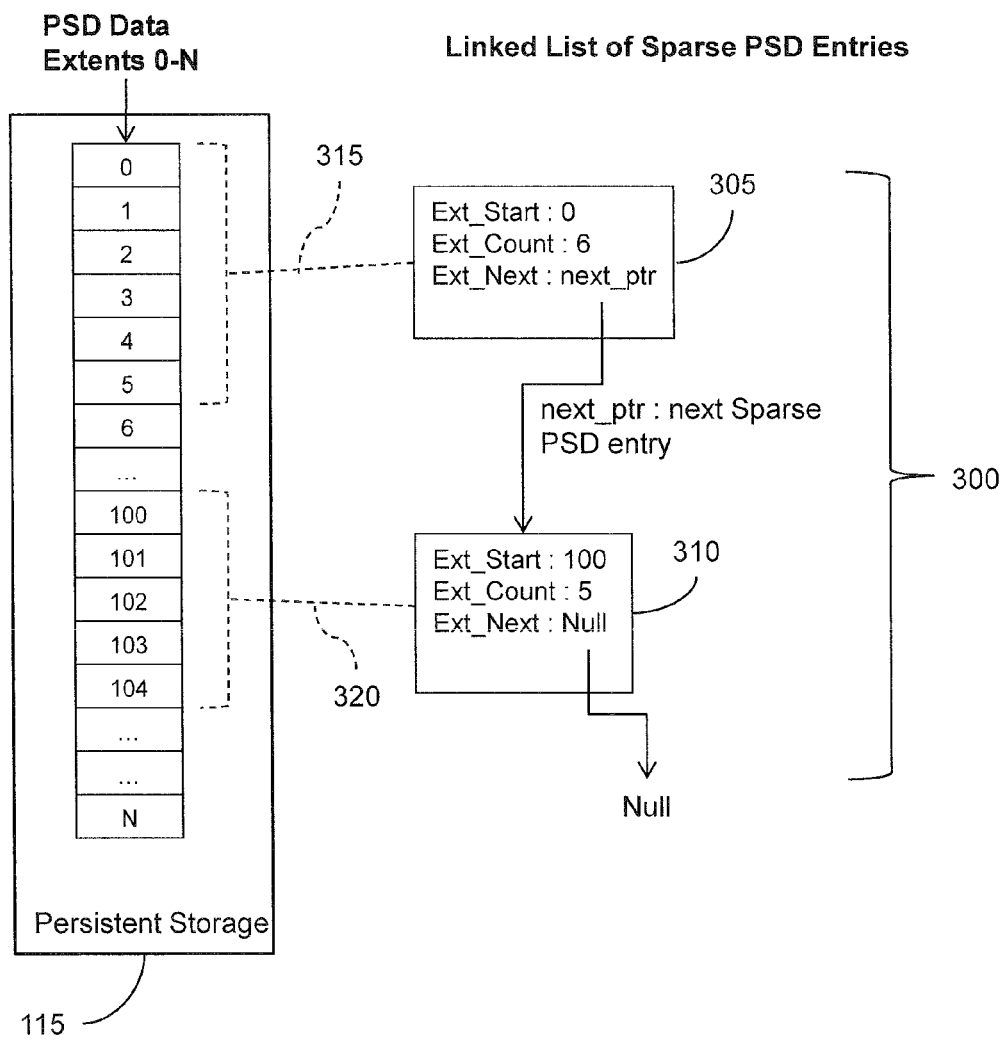
FIG. 3 illustrates one embodiment of a sparse data structure.

FIG. 3 illustrates one embodiment of a sparse format 300. For example, the sparse format 300 is a data structure formed by a linked list of data entries (e.g. data entries 305, 310, and so on). A data entry can also be regarded as a node or record in the linked list. Each data entry (e.g. 305, 310 . . . ) identifies at least the location of free data extents in the persistent storage device and identifies the next data entry in the linked list sequence. For example, data entry 305 identifies the data entry 310 as the next node in the linked list. In one embodiment, the next entry is identified by a pointer (e.g. pointer "next ptr"). The allocated data extents from persistent storage are not identified in the sparse format 300 and thus allocation data is not kept for the allocated data extents. This in turn reduces the amount of memory consumed by the data structure. In other embodiments, the sparse format can be implemented with other non-bit map formats in place of the linked list (e.g. an array, tree, table, and so on).

In one embodiment, the structure of each sparse data entry 305, 310 is configured to identify a group of contiguous data extents that are free and to identify the next data entry in the linked list. For example, data entry 305 includes at least three components: (1) the starting data extent that is free (e.g. "Ext Start" field), (2) the number of continuous free data extents from the starting extent (e.g. "Ext count" field) or end data extent number that is free, and (3) a pointer to the next sparse data entry (e.g. "Ext Next" pointer). "Ext" stands for "extent."

In FIG. 3, sparse data entry 305 identifies data extent "0" as the starting point of a group of free data extents and includes a count of "6". This means that from data extent 0, there are 6 free data extents in the free group (e.g. data extents numbered from 0 to 5). A mapping from the sparse data entry 305 to the free group is represented by the dashed-line 315. In another embodiment, the "Ext Count" field could be replaced with a field that identifies the ending free data extent in the group, which in this example would be 5. Thus data extents 0 to 5 are free for allocation. Similarly, the next data entry 310 identifies data extents 100 to 104 as the next free group (group is represented by dashed-line 320). For each continuous free group of data extents, one sparse data entry is used to identify the group. Since sparse data entry 310 is the last entry in the linked list example, its pointer points to "null." There may be, of course, many data entries in the linked list.

The sparse representation 300 is an efficient way to represent persistent storage's in-core metadata when most of the data extents are allocated or are free for a given persistent storage device. As the number of discontinuous groups of free data extents grows, so does the number of entries/nodes in the linked list. At a certain point depending on the usage of the persistent storage, the size of the linked list of the sparse format 300 grows and may become similar in size or even greater than the non-sparse format 200. If the size of the sparse format 300 becomes greater than the non-sparse format 200, then the system converts the structure of the data representation to the non-sparse format 200, thus reducing the amount of memory used. In the opposite scenario, if the non-sparse format 200 is being used and it is determined that the sparse format 300 would represent the data allocations in less space, then the system converts the data structure to the sparse format 300.

To determine the size of the data structures, with reference again to FIG. 1, the data representation converter 130 includes logic to determine the memory size of the sparse format 300 based on at least the number of data entries/nodes in the linked list. As data extents are allocated or freed from persistent storage 115, the number of nodes in the linked list may change. Each entry/node in the linked list has a predefined number of fields and thus occupies a known amount of memory. The linked list may be traversed to determine the number of nodes and/or a counter may be kept that is incremented when a new node is added to the linked list or decremented when a node is removed. The determination is performed during run-time and can be performed periodically (e.g. after an allocation operation is performed). The memory size of the bitmap representation of the non-sparse format 200 is fixed based on the number of data extents and thus is known at any given time. The data representation converter 130 then compares the two memory sizes and decides which one uses less memory. The current structure of the data representation that is in memory 110 is either not changed or is converted to the other structure during run-time based at least in part on the memory size comparison.

With reference to FIGS. 4A and 4B, one embodiment of methods 400 and 450 are shown that generally represents a process of managing the data structures as described in FIGS. 2 and 3. In FIG. 4A, method 400 is described from the perspective that the system is currently using the non-sparse format 200 (e.g. one-to-one bitmap format of metadata) to represent the data extent allocations in persistent storage. As discussed previously, metadata is used to represent the data allocations (e.g. bits identify whether a data extent is allocated or free). In FIG. 4B, method 45 is described from the perspective that the system is currently using the sparse format 300 or other non-bitmap format.

During run-time, the allocations in storage change as applications write data to or remove data from storage. Method 400 or 450 can be initiated after a designated event occurs. For example, the event may be after an allocation operation is performed, after an allocation operation is performed that affects certain size of in-core memory usage, after N number of allocation operations are performed, after a selected time period, and so on. At 405, memory size of the bitmap format of metadata is determined. At 410, the bitmap format is converted to the sparse format based at least in part on the memory size.

For example, if the sparse format can represent the current data allocations by using less memory, then the method converts the non-sparse bitmap data structure to the sparse format. As previously explained, the sparse format is formed with a linked list or other non-bitmap format.

In FIG. 4B, method 450 is performed where the sparse format is the current structure being used and it is converted to the non-sparse format. For example, at 455, the memory size of the sparse format is determined. At 460, if the size of the sparse format is larger than the bitmap format, then the sparse format is converted to the bitmap format. Another embodiment is described with reference to FIG. 5 that provides examples of how the conversion process may be performed.

Figure 5:
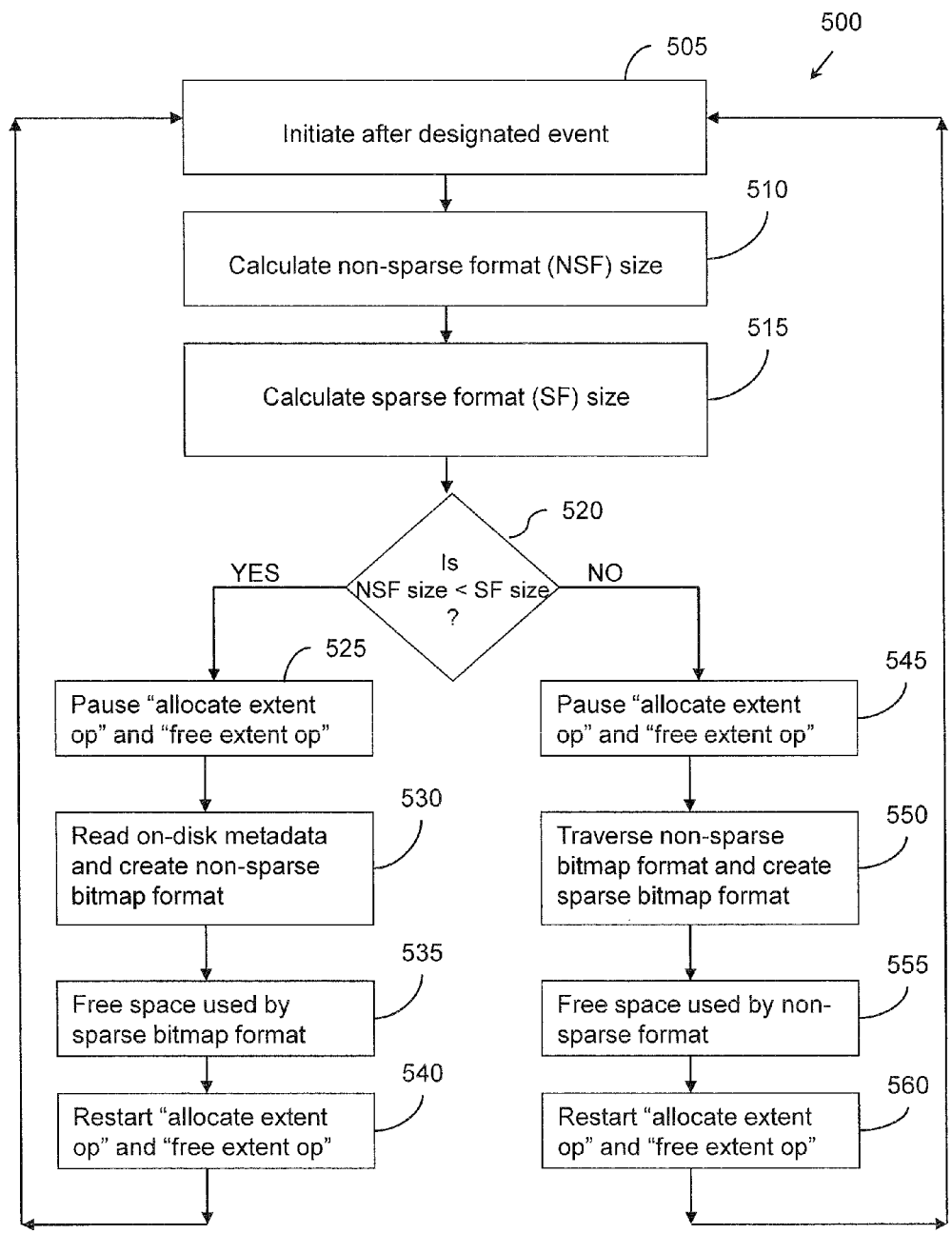
FIG. 5 illustrates one embodiment of a method associated with selecting and converting between different data structures.

FIG. 5 illustrates an embodiment of a method 500 that is associated with selecting and converting the in-core memory data structure between the sparse format and the non-sparse format. The method 500 is initiated after a designated event occurs. For example, the method 500 is initiated after an N-bit (1024 bits or greater) allocate extent operation or free extent operation is performed. Other example events were previously discussed. At 510, the size of the non-sparse format (NSF) is calculated. For example, the non-sparse format size is the total size required to represent the in-core metadata using the one-to-one mapping relationship (e.g. one bit assigned for each data extent in persistent storage). In one embodiment, a value can be stored and maintained in memory that reflects the current size of the data structure. Thus the total size can be determined by reading the value.

At 515, the size of the sparse format (SF) is calculated. For example, the method traverses an on-disk metadata that tracks all allocated and free data extents and calculates the total size required to represent the data allocations using the sparse format. For example, the persistent storage device maintains its own metadata of allocations (on-disk) using the non-sparse format. The on-disk metadata should match the in-memory metadata in terms of indicating the allocation status of the data extents. By determining the status of the allocations, the method can determine groups of free data extents and thus determine how many nodes are needed in the linked list to represent the sparse format. From the number of nodes, the size of the sparse format is determined. In another embodiment, the order of the calculations of blocks 510 and 515 are reversed. In one embodiment, a value can be stored and maintained in memory that reflects the current size of the sparse data structure. Thus the total size can be determined by reading the value.

At 520, the two sizes are compared. If the non-sparse format (NSF) size is less than the sparse format (SF) size, then the method switches to use the non-sparse format. At 525, the method pauses operations that allocate or free data extents so that allocations do not change during the conversion. At 530, the on-disk metadata is read from the persistent storage device to retrieve the allocation state of each data extent (e.g. which are allocated and which are free), and the non-sparse bitmap format is created. In general, the on-disk metadata is maintained in the non-sparse format and thus should be a copy of the in-memory metadata when the in-memory metadata is also in the non-sparse format. At 535, the memory space used by the sparse bitmap format is freed because it is replaced with the non-sparse format. At 540, once the non-sparse bitmap is ready, the allocate operations are restarted. The method may then return to the start and wait until the next designated event occurs.

Returning to 520 for the second possible scenario, suppose that the sparse format (SF) size is less than the non-sparse format. Similar operations are performed as in the first scenario (blocks 525-540). At 545, the allocate operations and free extent operations are paused. At 550, the non-sparse bitmap is traversed to determine the state of each data extent (e.g. allocated or free) and the sparse bitmap format is created from this information. At 555, the memory space used by the non-sparse format is freed because it is no longer being used.

At 560, once the sparse bitmap is ready, the allocate operations are restarted. The method may then return to the start and wait until the next designated event occurs.

In general and in some embodiments, the apparatus 100 from FIG. 1 may be implemented on a chip including one or more integrated circuits configured to perform one or more of the functions described herein. The apparatus 100 may be implemented in a computing device, for example, a computer, a laptop, a server, a cell phone, a hand held computing device, or other type of device that uses memory. The persistent storage device 115 may be part of the same device as the apparatus 100 (e.g. internal storage), may be external to the apparatus, or the apparatus can include both internal and external storage.

DEFINITIONS

The following includes definitions of selected terms employed herein. The definitions include various examples and/or forms of components that fall within the scope of a term and that may be used for implementation. The examples are not intended to be limiting and are to be used in conjunction with ordinary meanings. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

"Persistent Storage Device or PSD", as used herein, represents physical storage space present in a given system. Whenever system needs storage space, it is allocated from this persistent storage device. A persistent storage device can be a single disk, set of disks forming a RAID, a Virtual Volume or any other storage abstraction concept.

"Persistent Storage Data extent", as used herein, is a contiguous chunk of data present on a persistent storage device. It can also be a set of contiguous blocks from a disk drive or set of contiguous RAID stripes (if underlying storage is available in terms of RAID). The data extent size is typically fixed for a given persistent storage device.

"Allocated Data Extent", as used herein, is a "data extent" which is allocated (in use) from a persistent storage device and is classified as an "allocated data extent" of PSD.

"Free Data Extent", as used herein, is a "data extent" which is available for allocation and is classified as a "free data extent" of persistent storage device.

"Allocate Extent Operation", as used herein, is a task of allocating data extents from a PSD.

"Free Extent Operation", as used herein, is a task of freeing data extents/making them available for further allocations from a PSD.

"Persistent storage's in-core metadata", as used herein, keeps track of all allocated and/or free data extents of all persistent storage devices present on given system.

"Persistent storage's on-disk metadata", as used herein, persistently keeps track of all allocated and free data extents of all PSD present on given system. The on-disk metadata tracks the same allocation information as the in-core memory structures but is stored "on the disk" as opposed to in-memory. The persistent storage system uses the non-sparse bitmap representation to represent on-disk metadata because space is typically not an issue.

While for purposes of simplicity of explanation, illustrated methodologies in the figures are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
a converter configured to dynamically convert a structure of a data representation stored in a memory, wherein the structure is selectively converted between a sparse format and a non-sparse format, and wherein the data representation identifies data allocations in a persistent storage device;
wherein the converter is configured to convert the structure of the data representation based at least in part on a memory size of the sparse format as compared to a memory size of the non-sparse format during run-time.

2. The apparatus of claim 1, where the non-sparse format is a bitmap representation that includes a one-to-one correspondence of bits to a number of pre-defined data extents that are defined in the persistent storage device; and
where the sparse format is a linked list of data entries that identifies locations of data extents in the persistent storage device.

3. The apparatus of claim 2, where the converter includes logic to determine a memory size of the sparse format based on at least the linked list of data entries and to determine a memory size of the bitmap representation; and wherein the converter is configured to convert the structure of the data representation based at least in part on a comparison of the memory sizes.

4. The apparatus of claim 1, wherein the apparatus comprises an allocation logic that allocates or frees data extents defined in the persistent storage device.

5. The apparatus of claim 1, wherein the persistent storage device includes a pre-defined number of data extents.

6. The apparatus of claim 1, wherein the converter is configured to determine whether to convert the structure between the sparse format and the non-sparse format after an allocation operation is performed.

7. The apparatus of claim 1, wherein the converter is a data representation converter.

8. A method, comprising:

determining a memory size of a non-sparse format of metadata that represents data allocations for a persistent storage device; and converting the non-sparse format to a sparse format based at least in part on the memory size, wherein the sparse format includes a linked list.

9. The method of claim 8, where prior to the converting, the method comprises:

pausing execution of allocation operations that involve the persistent storage device;

generating the sparse format by traversing the non-sparse format of metadata to determine the data allocations; and restarting execution of the allocation operations.

10. The method of claim 8, further comprising generating the non-sparse format as a one-to-one relationship with data extents that are pre-defined in the persistent storage device, where an indicator in the non-sparse format designates an allocation state of one of the data extents.

11. The method of claim 8, wherein the determining and converting are performed after a data allocation operation is performed.

12. The method of claim 8, further including maintaining an on-disk metadata in the persistent storage device where the on-disk metadata designates an allocation status of each data extent in the persistent storage device.

13. The method of claim 8, further comprising generating the sparse format as a linked list of nodes where each node designates a group of contiguous data extents in the persistent storage device that are not allocated.

14. The method of claim 8, further comprising converting the sparse format to the non-sparse format when the memory size of the non-sparse format is less than a memory size of the sparse format.

15. A device comprising:

a memory; and a data representation converter configured to:

generate a non-sparse data structure that indicates an allocation status in a one-to-one mapping for each data extent that is defined in a persistent storage device;

generate a sparse data structure that includes a linked list of nodes, where each node identifies a group of contiguous data extents that are unallocated in the persistent storage device;

maintain allocation metadata in the memory, where the allocation metadata is a form of the non-sparse data structure or the sparse data structure; and convert the form of the allocation metadata between the non-sparse data structure and the sparse data structure based at least in part on which form uses less space in the memory.

16. The device of claim 15, wherein the non-sparse data structure includes a bitmap where one bit is stored for each data extent in the persistent storage device, where the one bit designates the allocation status as allocated or free.

17. The device of claim 15, wherein the each node in the linked list identifies a starting data extent that is free, a number of continuous free data extents from the starting data extent or end data extent number that is free, and a pointer to the next node in the linked list.

18. The device of claim 15, wherein the data representation converter includes logic to determine a memory size of the sparse data structure based on at least in part on the linked list of nodes and to determine a memory size of the non-sparse data structure; and wherein the data representation converter is configured to compare the memory sizes to determine which uses less space in the memory.

19. The device of claim 15, wherein the data representation converter is configured to determine whether to convert the form of the allocation metadata after an allocation operation is performed.

20. The device of claim 15, wherein the data representation converter is configured to convert the form of the allocation metadata during run-time.

* * * * *